(12) United States Patent
Riedijk et al.

(10) Patent No.: US 7,864,992 B2
(45) Date of Patent: Jan. 4, 2011

(54) FINGERPRINT SENSOR ELEMENT

(75) Inventors: Frank Robert Riedijk, Delft (NL); Johan Hammersberg, Göteborg (SE)

(73) Assignee: Fingerprint Cards AB (SE)

(*) Notice: Subject to any disclaimer, the term of this patent is extended or adjusted under 35 U.S.C. 154(b) by 914 days.

(21) Appl. No.: 11/629,328

(22) PCT Filed: Jun. 18, 2004

(86) PCT No.: PCT/SE2004/000985
§ 371 (c)(1), (2), (4) Date: Dec. 11, 2006

(87) PCT Pub. No.: WO2005/124659
PCT Pub. Date: Dec. 29, 2005

(65) Prior Publication Data
US 2008/0069413 A1   Mar. 20, 2008

(51) Int. Cl.
*G06K 9/00* (2006.01)
(52) U.S. Cl. .................................. 382/124
(58) Field of Classification Search ............. None
See application file for complete search history.

(56) References Cited

U.S. PATENT DOCUMENTS

| | | | |
|---|---|---|---|
| 5,325,422 A | 6/1994 | Ladd | |
| 5,325,442 A * | 6/1994 | Knapp | 382/124 |
| 5,862,248 A | 1/1999 | Salatino et al. | |
| 5,940,526 A | 8/1999 | Setlak et al. | |
| 5,963,679 A | 10/1999 | Setlak | |
| 6,016,355 A * | 1/2000 | Dickinson et al. | 382/124 |
| 6,088,585 A | 7/2000 | Schmitt et al. | |
| 6,248,655 B1 | 6/2001 | Machida et al. | |
| 6,370,965 B1 | 4/2002 | Knapp | |
| 6,501,142 B2 | 12/2002 | Thomas et al. | |

(Continued)

FOREIGN PATENT DOCUMENTS

DE   19857674 C1   5/2000

(Continued)

OTHER PUBLICATIONS

"PCT Application No. PCT/SE2004/000985, International Search Report mailed Jan. 21, 2005", 2 pgs.

(Continued)

*Primary Examiner*—Brian P Werner
(74) *Attorney, Agent, or Firm*—Schwegman, Lundberg & Woessner, P.A.

(57) ABSTRACT

The present invention relates to a fingerprint sensor element, comprising a sensor electrode formed in an upper conducting layer, a lower electrode formed in a lower conducting layer and at least one insulating layer between the upper conducting layer and the lower conducting layer. It further comprises a charge amplifier having a negative and a positive input terminal and an output terminal. An upper side of the fingerprint sensor electrode is arranged for facing a finger and a lower side is arranged for facing the lower electrode, and the fingerprint sensor electrode and the lower electrode are arranged in such a way that a capacitance is formed between them. The sensor electrode is arranged for being connected to the negative input terminal of the charge amplifier, and the lower electrode is arranged for being connected to the output terminal of the charge amplifier.

20 Claims, 7 Drawing Sheets

U.S. PATENT DOCUMENTS

| | | | |
|---|---|---|---|
| 6,636,053 B1 | 10/2003 | Gozzini | |
| 6,665,428 B1 | 12/2003 | Gozzini et al. | |
| 6,681,033 B1 | 1/2004 | Yano et al. | |
| 2003/0099380 A1* | 5/2003 | Gozzini | 382/124 |
| 2010/0084542 A1* | 4/2010 | Chou | 250/214 A |

FOREIGN PATENT DOCUMENTS

| | | |
|---|---|---|
| EP | 0457398 A2 | 11/1991 |
| EP | 0779497 A2 | 6/1997 |
| EP | 0791899 A2 | 8/1997 |
| EP | 1113383 A2 | 7/2001 |
| EP | 1315119 A | 5/2003 |
| JP | 4-2318030 A | 8/1992 |
| JP | 2002-162204 A | 6/2002 |
| JP | 2002-185703 A | 6/2002 |
| JP | 2003-207306 A | 7/2003 |
| JP | 2003-262503 A | 9/2003 |
| WO | WO-03050469 A2 | 6/2003 |

OTHER PUBLICATIONS

Enz, C. C., et al., "Circuit Techniques for Reducing the Effects of Op-Amp Imperfections: Autozeroing, Correlated Double Sampling, and Chopper Stabilization", *Proceedings of the IEEE*, 84(11), (1996), 1584-1614.

Hashido, Ryuichi, et al., "A Capacitive Fingerprint Sensor Chip Using Low-Temperature Poly-Si TFTs on a Glass Substrate and a Novel and Unique Sensing Method", *IEEE Journal of Solid-State Circuits*, vol. 38, No. 2, (Feb. 2003), 274-280.

Jung, Stefan, et al., "A Low-Power and High-Preformance CMOS Fingerprint Sensing and Encoding Architecture", *IEEE Journal of Solid-State Circuits*, vol. 34, No. 7, (Jul. 1999), 978-984.

Lee, Kwang-Hyun, et al., "A 500dpi Capacitive-Type CMOS Fingerprint Sensor with Pixel Adaptive Image Enhancement Scheme", *ISSCC 2002, Session 21, TD: Sensors and Microsystems*, 21.3, (Feb. 6, 2002), 3 Pages.

Lee, Jeong-Woo, et al., "A 600-dpi Capacitive Fingerprint Sensor Chip and Image-Synthesis Technique", *IEEE Journal of Solid-State Circuits*, vol. 34. No., (Apr. 1999), 469-475.

Manaresi, Nicolo, et al., "A CMOS-Only Micro Touch Pointer", *IEEE Journal of Solid-State Circuits*, vol. 34, No. 12, (Dec. 1999), 1860-1868.

Morimura, Hiroki, et al., "A Novel Sensor Cell Architecture and Sensing Circuit Scheme for Capacitive Fingerprint Sensors", *IEEE Journal of Solid-State Circuits*, vol. 35, vol. 5, (Oct. 2002), 724-731.

Morimura, Hiroki, et al., "A Pixel-Level Automatic Calibration Circuit Scheme for Capacitive Fingerprint Sensor LSIs", *IEEE Journal of Solid-State Circuits*, vol. 37, No. 10, (Oct. 2002), 1300-1306.

Tartagni, Marco, et al., "A Fingerprint Sensor Based on the Feedback Capacitive Sensing Scheme", *IEEE Journal of Solid-State Circuits*, vol. 33, No. 1, (Jan. 1998), 133-142.

International Search Report for corresponding application PCT/SE2004/000985, date of mailing Jan. 21, 2005 (2 pages).

Written Opinion of the International Search Authority for corresponding application PCT/SE2004/000985, date of mailing Jan. 21, 2005 (4 pages).

"Japanese Application Serial No. 2007-516421, Office Action mailed Apr. 6, 2010", (w/ English Translation), 6 pgs.

\* cited by examiner

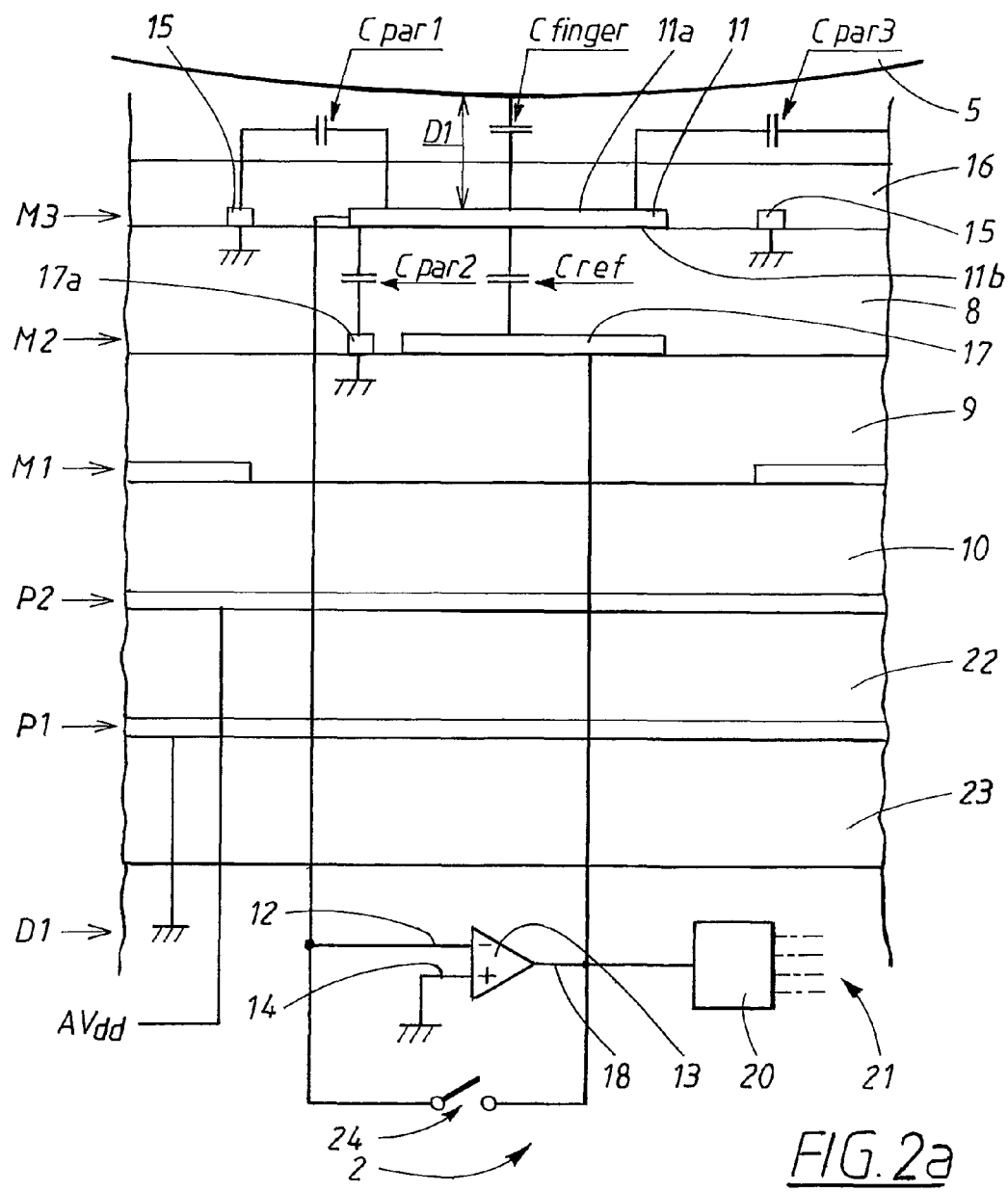
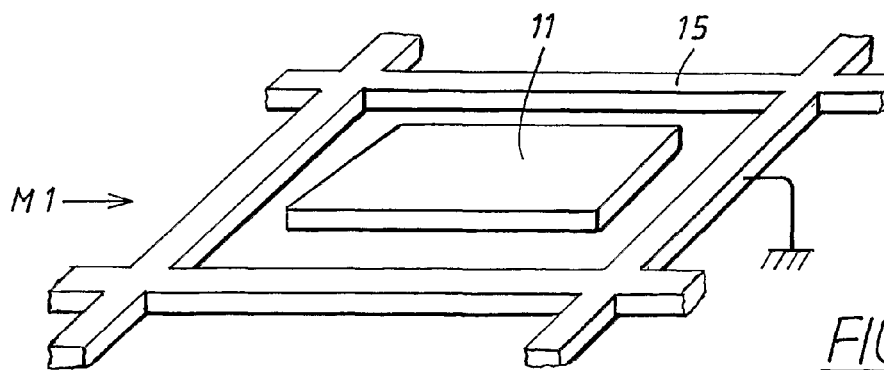
FIG. 2a
FIG. 2b

FINGERPRINT SENSOR ELEMENT

RELATED APPLICATIONS

This application is a nationalization under 35 U.S.C. 371 of PCT/SE2004/000985, filed Jun. 18, 2004 and published as WO 2005/124659 A1, on Dec. 29, 2005, which application and publication are incorporated herein by reference and made a part hereof.

TECHNICAL FIELD

The present invention relates to a fingerprint sensor element comprising a fingerprint sensor electrode formed in an upper conducting layer, a lower electrode formed in a lower conducting layer, at least one insulating layer between the upper conducting layer and the lower conducting layer, a charge amplifier having a negative and a positive input terminal and an output terminal, where an upper side of the fingerprint sensor electrode is arranged for facing a finger and a lower side of the fingerprint sensor electrode is arranged for facing the lower electrode, and where the fingerprint sensor electrode and the lower electrode are arranged in such a way that a capacitance is formed between them, and where the sensor electrode is arranged for being connected to the negative input terminal of the charge amplifier.

The present invention also relates to a fingerprint sensor, comprising fingerprint sensor elements according to the above.

BACKGROUND ART

Fingerprint recognition systems have been devised for a variety of objects concerning personal recognition, for example access control for buildings, smart cards, weapon enable/disable arrangements and computer access. Fingerprint recognition systems are easy to use, no codes will have to be remembered and no keys will have to be brought, while a high level of security is obtained.

Fingerprint sensors have previously been made as optical sensors, having optical reading sensor elements. However, these optical reading sensor elements are quite expensive, bulky and sensitive to dirt. Therefore, different types of capacitive sensor elements have been devised instead, where the capacitance between the structure of a fingerprint and corresponding sensor plates is measured.

Normally, the sensor plates, consisting of thin metal electrodes, are arranged in rows and columns, forming a sensor matrix arranged to read the structure of a fingerprint. Many types of fingerprint sensors have been developed, many of these types measure a finger capacitance between the finger and a top sensor electrode. Others types have two fixed sensor electrodes, either arranged on top of each other in different layers or between each other, between which plates there is a fixed capacitance. This capacitance is changed when the presence of the finger affects the electric field between the plates. The finger is often excited or grounded, for example by means of a conducting frame surrounding the sensor matrix, or kept at a ground level by means of a large capacitive coupling to ground.

Normally, the top part of the sensor structure comprises several conductive layers consisting of metal layers and so-called polysilicone layers having insulating dielectric layers inserted between them, where the top conductive layer constitutes the sensor electrodes. A problem for all capacitive fingerprint sensors of today is the presence of parasitic capacitors. There are always parasitic capacitors between each sensor electrode in the top layer and the lower layers. There are also parasitic capacitors between each sensor electrode in the top layer and one or more neighbouring sensor electrodes in the top layer, so-called lateral parasitic capacitors.

In many fingerprint sensors, this parasitic capacitor lies in parallel with the finger, for example when the finger and a bottom (shielding) plate are connected to each other, a common configuration. Since this parasitic capacitor can be much larger then the capacitance to the finger, it can disturb the measurement. Therefore, many different designs have been developed for capacitive fingerprint sensor elements in order to more or less eliminate the parasitic capacitors.

In the article "A 500 dpi capacitive-type CMOS fingerprint sensor with pixel-level adaptive image enhancement scheme" by Kwang Hyun Lee and Euisik Yoon, a fingerprint sensor element is described, which fingerprint sensor element measures a finger capacitance between the finger and a top sensor electrode. Between each top sensor electrode (metal 3) and an underlying conductive layer (metal 2), there is a parasitic capacitor. The underlying conductive layer is coupled to a voltage source, keeping it at a certain controllable potential $V_r$. Each top sensor electrode is connected to the negative input of a charge amplifier and the underlying conductive layer (metal 2) to the positive input of the charge amplifier, thus virtually connecting each top sensor electrode and the underlying conductive layer 2 to the same potential by means of the charge amplifier. in this way, this parasite capacitor is virtually eliminated.

Having a large capacitor at the input of a charge amplifier, as is the case in this article, is, however, disadvantageous concerning noise performance of the sensor element. The fact that a large parasitic capacitor at the input of a charge amplifier is disadvantageous concerning noise performance, is a previously known fact. The input capacitor is cancelled out only with regard to the signal injected from the finger electrode. But for other sources, such as amplifier noise, the parasitic capacitor has another position in the circuit and therefore another transfer function accounts.

The transfer function for amplifier noise sources, seen as a voltage source at the positive pin of the amplifier, contains the term $C_{total\ input}/C_{ref}$. Therefore, it is beneficial for the noise performance to keep the total input capacitance, i.e. $C_{finger} + C_{parasitic} + C_{ref}$, as low as possible. Similarly, the interference noise that is injected into the negative input between $C_{par}$ and ground, via the shielding or driving metal electrode, contains the term $C_{par}/C_{ref}$, which implies that it is beneficial with regard to noise and interference to keep the parasitic capacitance at a low level.

Furthermore, the article discloses sensor electrodes which are not kept at the same potential, which makes the measurement of the capacitance between the finger and each sensor electrode dependant on lateral parasitic capacitances, which will vary with the current local skin condition, leading to a deteriorated fingerprint image. In other words, not only the capacitance between the finger and the sensor plate in question is measured, but also the lateral capacitances between the sensor plate in question and its neighbouring sensor plates are measured, since only the sensor plate in question is provided with a signal, while the neighbouring sensor plates are not. This results in an unreliable measurement with a reduced image resolution.

Furthermore, the article discloses a feedback capacitor which is realized using lower layers in the layer configuration of the sensor element, which is an inefficient use of the available layers.

DISCLOSURE OF THE INVENTION

It is therefore an object of the present invention to provide a fingerprint sensor element that more efficiently eliminates the parasitic capacitors and enables a more efficient use of the available layers.

This object is achieved by means of a fingerprint sensor element as disclosed in the introduction, where the lower electrode is arranged for being connected to the output terminal of the charge amplifier.

This object is further achieved by means of a fingerprint sensor comprising fingerprint sensor elements according to the above.

Preferred embodiments are disclosed in the independent claims.

A large number of advantages are obtained by means of the present invention, for example:

- The large parasitic capacitance at the input of the charge amplifier is converted into a feedback capacitor
- The gain of each fingerprint sensor element can be tuned by adjusting the values of the sensor electrode capacitor and the feedback capacitor.
- A relatively large gain can be acquired at the same time as the noise can be kept at a relatively low level, leading to a relatively high signal to noise ratio (SNR).
- A high gain and a low SNR allow the use of a relatively thick protective coating, leading to an enhanced ESD protection.
- The lateral parasitic capacitance effects are reduced, resulting in an increased resolution.
- The layers of the fingerprint structure are more efficiently used.
- The interference noise is reduced since the parasitic capacitances are reduced.
- Several separate fingerprint sensor elements may be connected to one single charge amplifier via an analogue multiplexer. The resolution then becomes tuneable.
- A relatively large distance may be present between the layers in order to further minimize the total input capacitance and thus the amplifier noise.

BRIEF DESCRIPTION OF THE DRAWINGS

The invention will now be described more in detail with reference to the appended drawings, where:

FIG. 2a schematically shows a cross-section of a fingerprint sensor element according to a first embodiment of the present invention;

FIG. 2b schematically shows a perspective top view of a fingerprint sensor element according to a first embodiment of the present invention;

MODES FOR CARRYING OUT THE INVENTION

Figure 1:
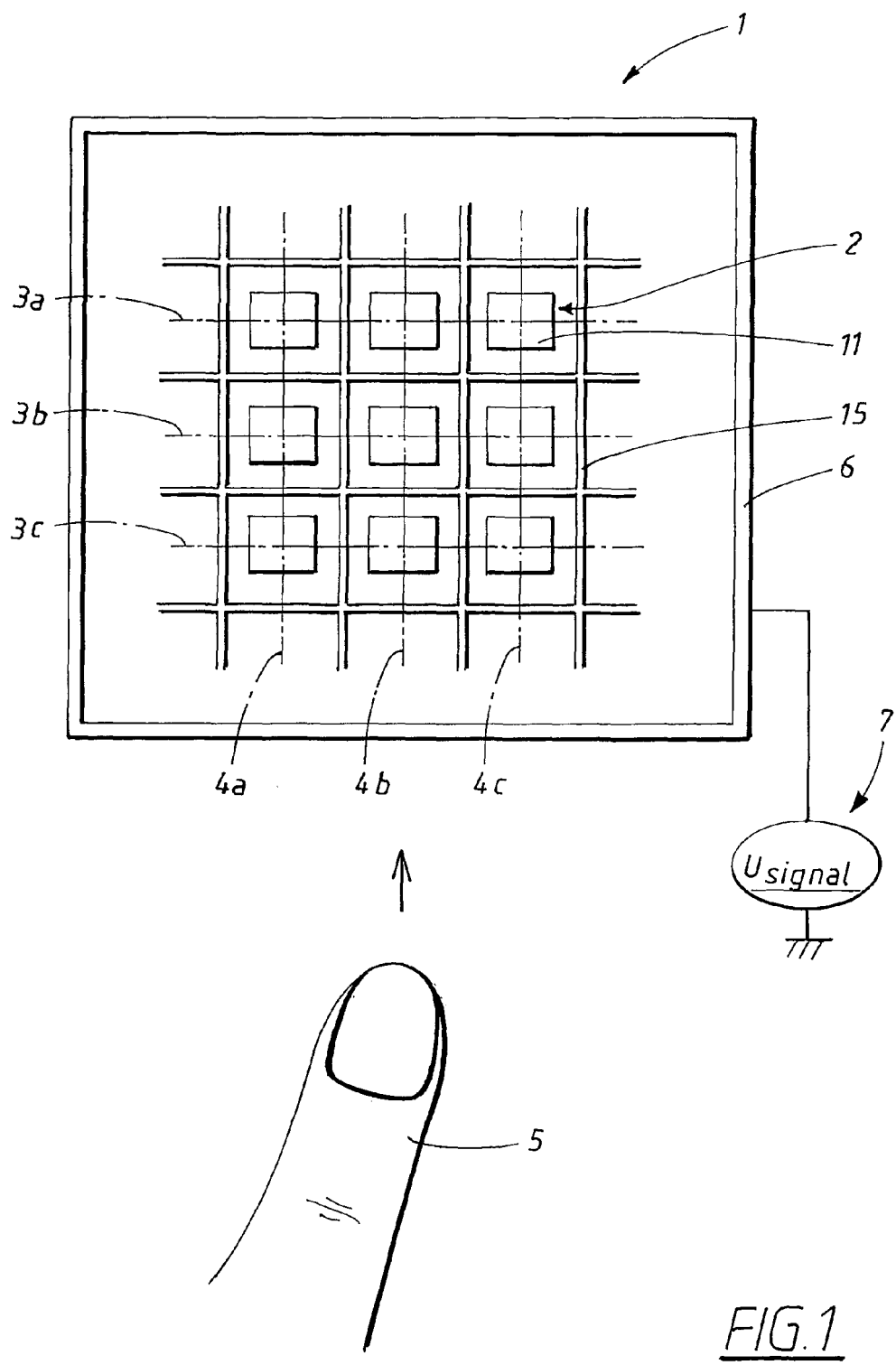
FIG. 1 schematically shows a fingerprint sensor according to a first embodiment of the present invention.

With reference to FIG. 1, a fingerprint sensor 1 according to the invention preferably comprises fingerprint sensor elements 2 that are arranged in rows 3a, 3b, 3c and columns 4a, 4b, 4c, forming a matrix of fingerprint sensor elements 2.

A finger 5 contacting the fingerprint sensor 1 is excited by means of a frame 6 surrounding the matrix of fingerprint sensor elements 2 as shown in FIG. 1, which frame 6 is in contact with the finger during the sensing process of a fingerprint image. The frame 6 is fed with a signal $U_{signal}$ that is transferred from a signal generator 7 to the finger 5 via the frame 6, when the frame 6 and the finger 5 are in contact with each other.

A single fingerprint sensor element 2 according to the present invention will now be described more in detail with reference to FIG. 2a. All the fingerprint sensor elements 2 are formed in a layer structure comprising three conductive layers; a conductive layer M3 at the top, a conductive layer M2 in the middle and a lower conductive layer M1, with a first 8, second 9, and third 10 layer of an insulating dielectric material under the respective conductive layers M3, M2, M1. Examples of materials for the conductive layers are typically copper, aluminium and doped polycrystalline silicone. Examples of materials for the insulating layers are typically $SiO_2$, SiN, $SiNO_x$ and glass. At the top conductive layer M3 there is formed a separate sensor electrode 11 for each fingerprint sensor element 2, which sensor electrode 11 is connected to a negative input terminal 12 of a charge amplifier 13. There is one charge amplifier 13 provided for each fingerprint sensor element 2. A positive input terminal 14 of the charge amplifier 13 is connected to ground, therefore, by means of the charge amplifier 13, the corresponding sensor electrode 11 that is connected to the negative input terminal 12 is virtually grounded, since the voltage over the input terminals 12, 14 of the charge amplifier 13 is almost zero.

With reference also to FIG. 1 and FIG. 2b, each sensor electrode 11 is surrounded by a shield frame 15 formed in the top conductive layer M3, where the shield frame 15 is connected to ground potential as a conductive shielding to prevent lateral parasitic capacitances between adjacent sensor electrodes 2, thus preventing crosstalk between the sensor electrodes 2. The shield frame 15 may also be connected to another suitable controlled voltage potential, such as the analogue power potential.

Further, referring to FIG. 2a, there is a protective layer 16 covering each one of the sensor electrodes 11, protecting them from ESD (Electrostatic Dischage) and external wear. A finger 5 that comes into the vicinity of the upper surface of the protective layer 16 gives rise to a variable capacitance between the finger and the surface of the protective layer due to the structure of the finger with ridges and valleys, and there is also a fixed capacitance between the surface of the protective layer and the sensor electrode. The series connection of these capacitances $C_{finger}$ is detected by the sensor electrode 11. Depending on the structure of the finger 5 with ridges and valleys, the value of the variable capacitance will vary, thus providing information concerning the fingerprint image. It is to be noted that the finger 5 in FIG. 2a is only shown schematically to indicate its position relative to the layer structure 8.

According to the present invention, a lower electrode 17 is formed in the middle conductive layer M2 for each fingerprint sensor element 2. The lower electrode 17 is connected to an output terminal 18 of the charge amplifier 13. Due to this connection, there is a feedback capacitance $C_{ref}$ formed between each sensor electrode 11 and each lower electrode 17, which feedback capacitance $C_{ref}$ then is connected between the negative input terminal 12 of the charge amplifier 13 and an output terminal 18 of the charge amplifier 13. The sensor electrode 11 has an upper side 11a, facing the finger 5, and a lower side 11b, facing the lower electrode 17.

$C_{ref}$ thus forms a feedback capacitor, in this way no large parasitic capacitor is formed at the input of the charge amplifier 13, and thus the noise and interference characteristics are reduced considerably compared to prior art. This allows the thickness of the protective layer 16 to be greater than for the prior art, as the low SNR (Signal to Noise Ratio) makes it possible to enhance the gain for each fingerprint sensor element compared to the prior art. The thicker protective layer 16, made possible by means of the present invention, reduces the risk for an ESD discharge from the finger 5 to the sensor electrode 11, since the breakdown voltage between the finger and the frame 6 surrounding the fingerprint sensor 1 becomes lower than the breakdown voltage between the finger and the sensor electrode 11. The frame 6 is connected to means (not shown) for exciting the finger 5 with a signal pulse and diverting ESD from the finger 5.

An auxiliary lower electrode 17a is also formed in the middle conductive layer M2, adjacent to the lower electrode 17. The auxiliary lower electrode 17a is connected to ground and used as an extra shielding, in case $C_{ref}$ does not extend over the sensor electrode 11. The size of the auxiliary lower electrode 17a is adjusted to fit beside the lower electrode 17, as the size of the lower electrode 17 is adapted for acquiring the desired gain of each fingerprint sensor element 2, as this gain can be tuned for the fingerprint sensor element 2 in the production layout by adjusting the values of the sensor electrode capacitor, i.e. the physical dimensions of the sensor electrode 11, the lower electrode 17, the auxiliary lower electrode 17a and the first layer of an insulating dielectric material 8.

There will, however, occur a first and second parasitic capacitance $C_{par1}$, $C_{par2}$ between the negative input terminal 12 of each charge amplifier 13 and ground. $C_{par1}$ is due to a lateral capacitance between each sensor plate 11 and its surrounding shield frame 15. $C_{par2}$ is due to a capacitance between each sensor electrode and each auxiliary lower electrode 17a. There will also occur a third parasitic capacitance $C_{par3}$ between the neighbouring sensor plates (not shown).

Figure 3:
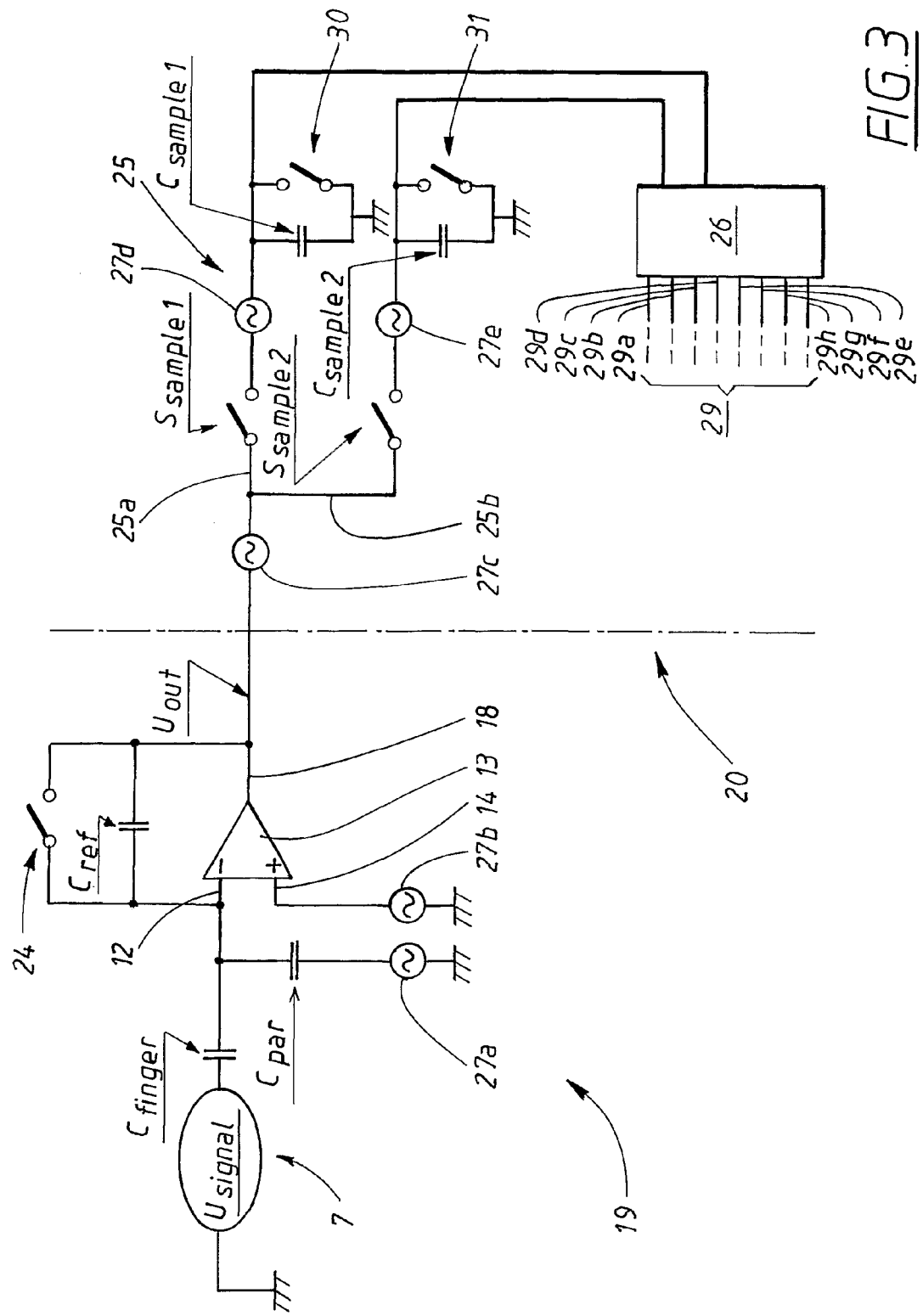
FIG. 3 schematically shows an equivalent electric circuit of a fingerprint sensor element according to a first embodiment of the present invention.

In FIG. 3, a schematic is shown for the equivalent circuit 19 of a sensor element 2. The resultant parasitic capacitance is there shown with the reference designation $C_{par}$ between the negative input terminal 12 of the charge amplifier 13 and ground.

With reference to FIGS. 1-3, as the finger 5 is excited with the electrical signal $U_{signal}$ via the surrounding frame 6, the skin above each sensor electrode 11 carries this signal. The signal $U_{signal}$ is preferably of a pulsating type. The charge that is transmitted from the finger 5 to a sensor electrode 11 is proportional to the capacitance $C_{finger}$ between the skin and the sensor electrode 11, and thus inversely proportional to a distance D1 between the skin and the sensor electrode 11. As the sensor electrode 11 is virtually grounded, its charge is transferred by the charge amplifier 13 to the feedback capacitance $C_{ref}$ which has a known value. Then we may calculate the signal output $U_{out}$ from the charge amplifier 13 as $$U_{out} = (C_{finger}/C_{ref})U_{in}$$

The signal outputs from all the charge amplifiers of the fingerprint sensor 1 are transferred to a control unit 20 in the fingerprint sensor, which control unit 20 may be an integrated circuit of a known type. Based on all the signals outputs, the control unit 20 may calculate and transmit pixel signal values representing the fingerprint image to an auxiliary unit (not shown). The function of the control unit 20 and how this is accomplished is described more in detail below. The control unit 20 is indicated as being provided with a plurality of connections 21 with dotted lines in FIG. 2a.

As shown in FIG. 2a, there are further lower layers in the layer structure, comprising a fourth layer P2 constituted by an electrically conducting layer which is kept at a certain analogue voltage potential $AV_{dd}$. Further, there is a fifth layer P1 that also is constituted by an electrically conducting layer which is kept at ground potential, working as an electric shielding. Under each one of these layers P2, P1 there is a fourth 22 and fifth 23 layer of an insulating dielectric material. In the bottom, there is a semi conductive substrate layer T1 comprising active components such as the charge amplifiers 13. The conductive layers P2, P1 as well as the lower conductive layer M1 described above, may for example be used for routing of electrical connections, resistors and electrical shielding. One of the conductive layers P2, P1 may also be used to form the lower electrode of each fingerprint sensor element, as will be described later.

The charge amplifiers 13 are implemented in CMOS technology, where, prior to the signal application and sampling occasion, a DC level of the charge amplification is maintained by means of a reset switch 24, shown in FIG. 3, placed between the negative input terminal 12 and the output terminal 18 of each charge amplifier 13, and thus in parallel with $C_{ref}$. Should the charge amplifier 13 not be equipped with the reset switch 24, there are only capacitors connected to the negative input terminal 12. This terminal 12 has to have a certain DC voltage to keep the active elements in the current biasing state.

Using a reset switch 24 positioned over the reference capacitor $C_{ref}$ is a well known technique to accomplish such a DC level. In the embodiments described, the DC level would be zero volt because the positive terminal 14 of the charge amplifier 13 is connected to ground. By resetting the charge amplifier 13, the negative input terminal 12 is virtually connected to the positive input terminal 14, and thereby to ground.

Each fingerprint sensor element 2 constitutes a pixel, which can be selected individually using an x-y selection matrix, which has the ability to switch the signal of each individual pixel to a central sampling part 25 and an A/D (analogue to digital) converter 26 comprised in the control unit 20. A more detailed description of the sampling part 25 of the circuit follows later in the description.

As each pixel is connected to an individual charge amplifier 13, the design of the charge amplifier 13 has to remain simple due to space limitations. Maintaining a simple charge amplifier design, results in that noise has to be compensated for. The noise concerned is in the following forms:

1/f-noise and thermal noise in the pixel amplifier. This is normal noise present in each amplifier. For MOSfet components, especially the 1/f noise source is dominant. This noise which is inversely proportional to the frequency grows at lower frequencies, making the double-correlated sampling technique used necessary.

Offset noise. It is present in any amplifier because of the mismatch of used components.

Transmission line (or parasitic capacitor) noise injection. This is the pickup of mainly digital spikes on the signal lines or capacitive shielding structures which is caused by the presence of digital circuits on the same chip. This can be a dangerous noise source, because it can be correlated. Correlation means that on the moment we sample the signal, a digital spike can occur at the same time. This noise always appears, and is not detected as noise, but as a signal change (offset). This is dealt with by using triple-correlated sampling.

Reset switch charge injection. Inside the reset switch 24, there is actually a small parasitic capacitor (not shown) connected between the negative input terminal 12 of the amplifier 13 and the reset drive signal. If we release the switch 24, the voltage over this small parasitic capacitor is charged because the reset drive signal changes. The charge injected is then seen as a signal.

In FIG. 3, a number of noise sources 27a-e are shown. These are not real sources, but only representations of noise that appear. A first noise source 27a is positioned between $C_{par}$ and ground, representing interference noise. A second noise source 27b is positioned between the positive input terminal 14 of the charge amplifier 13 and ground, representing thermal noise. A third noise source 27c is positioned where the output $U_{out}$ of the charge amplifier 13 enters the control unit 20, representing interference noise, which noise is due to capacitive coupling to conductor patterns and substrate. The two noise sources 27d, 27e following the switches $S_{sample1}$ and $S_{sample2}$, represent timing noise source or phase noise source. These two latter noise sources causes an undesirable static offset at the sampling and will be discussed further in the description.

The compensation that is performed by means of so-called double-correlated sampling, which will now be explained with reference to FIG. 3 and FIG. 4.

Figure 4:
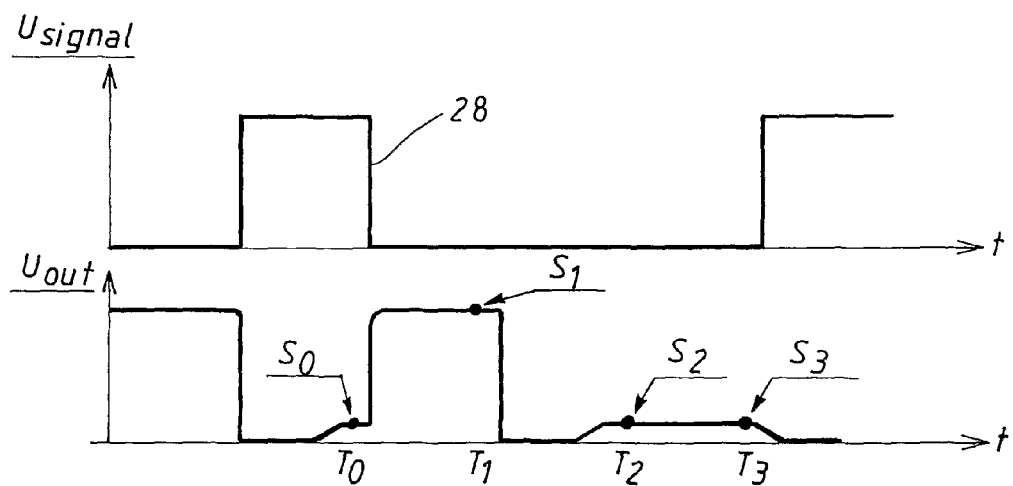
FIG. 4 schematically shows graphs of an input signal and a corresponding detected signal over time.

In FIG. 4, two signal forms are shown. The first signal $U_{signal}$ is a signal that is injected into the finger and the second signal $U_{out}$ is an output of a charge amplifier 13 in response to the coupled signal from the finger 5. Normally, the amplitude of the second signal $U_{out}$ increases with increasing finger capacitance $C_{finger}$. On the positive slope 28 of the first signal $U_{signal}$, the reset switch 24 of the charge amplifier 13 is closed. When the system is fully stabilized, the switch 24 is opened again, causing a small offset signal due to charge injection. After that, the first signal drops again and $V_{out}$ rises accordingly depending on the value of $C_{finger}$.

The positive and negative slope depends on which kind of charge amplifier 13 that is used. If, for example, NMOS or PMOS is used, this determines whether the positive output terminal 14 of the charge amplifier 13 is connected to ground, which is the case in the embodiment examples in this description, or to a feeding potential, for example the $AV_{dd}$ connection. In either case, the positive output terminal 14 of the charge amplifier 13 is connected to an essentially fixed potential. On the positive slope of $U_{signal}$ there is a reset action. The signal on the negative input terminal 12 is then grounded. After the input signal drops, $V_{out}$ rises.

The output signal $U_{out}$ is sampled at the moments T0 and T1, having the corresponding amplitudes S0 and S1. The output signal is calculated as S1-S0, which is called double-correlated sampling technique. In this way, it is possible to eliminate the charge injection of the reset switch and any other offset or low frequency (1/f) noise that may occur.

At the first moment T0, in a first sampling branch 25a, a first sampling switch $S_{sample1}$ is released and the voltage is sampled at a first sampling capacitor $C_{sample1}$. The same applies at the second moment T1 for a second sampling switch $S_{sample2}$ and a second sampling capacitor $C_{sample2}$ in a second sampling branch 25b. The voltage on both sampling capacitors $C_{sample1}$, $C_{sample2}$ can then be subtracted as S1-S0.

The subtraction is performed by means of digital means. The sampling branches 25a, 25b continue to the A/D converter 26. The output of the A/D converter 26 comprises outputs 29 corresponding to the digital resolution provided by the A/D converter used. In FIG. 3, eight outputs 29a-h are shown, corresponding to a resolution of eight bits. The output of the A/D converter 26 is further fed into means (not shown) for processing this output and creating an image of a fingerprint.

The subtraction may alternatively be performed by means of an analogue circuit using a differential amplifier (not shown) subtracting the signals in the two branches from each other and feeding the difference into the A/D converter 26.

Depending on how the subtraction S1-S0 is performed, more or less parts of the low-frequency noise are eliminated.

Figure 5:
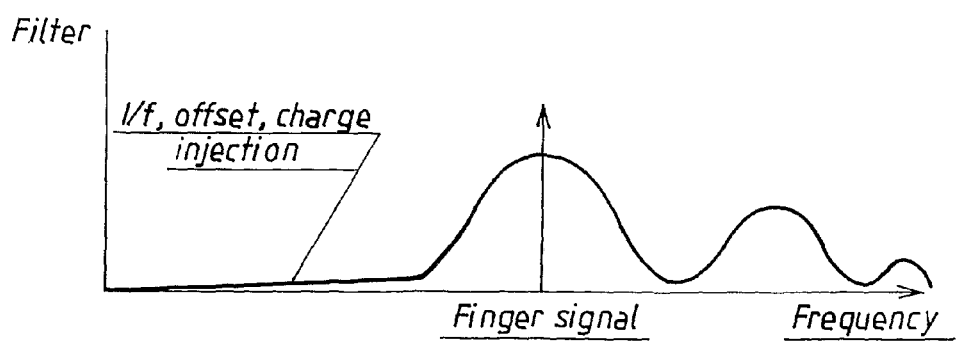
FIG. 5 schematically shows a spectral graph of a detected and sampled signal.

In FIG. 5, a frequency plot of this subtraction is shown. There, an important part of low-frequency noise generated by the charge amplifier 13 and signal lines is eliminated, thus improving the noise performance even more. On the y-axis the frequency response of the double-correlated sampling action is shown. This means that if the graph has a relatively low value, a large reduction of the noise is obtained. The graph shows that only a part of the signal and noise is filtered out, which reduces the noise bandwidth and therefore the total noise energy drastically.

If there is any mismatch of sampling time in combination with digital interference noise, as explained earlier, there will be a correlated noise source and thus an offset. This offset can be eliminated by using triple-correlated sampling, where another subtraction is performed.

Triple-correlated sampling includes a second phase of the sampling procedure, in which either no signal, as shown in FIG. 4, or a different signal, is applied. In either case, the input is constant during the second phase of the sampling procedure. The output signal $U_{out}$ is then not only sampled at the moments T0 and T1, but also at the moments T2 and T3, having the corresponding amplitudes S2 and S3. At the third moment T2, the first sampling switch $S_{sample1}$ is once again released and the voltage is sampled at the first sampling capacitor $C_{sample1}$. The same applies at the fourth moment T3 for the second sampling switch $S_{sample2}$ and the second sampling capacitor $C_{sample2}$. The voltage on both sampling capacitors $C_{sample1}$, $C_{sample2}$ can then be subtracted as S3-S2. The subtraction is performed in the same way as described previously. In this way, noise induced due to the sampling procedure, the sampling offset, may be identified and subtracted from the result. The sampling offset is subtracted from the first result, i.e. the output becomes $S_{out}$=S1-S0-(S3-S2), eliminating the sampling offset.

The sampling capacitors $C_{sample1}$, $C_{sample2}$ are discharged after each sampling by means of corresponding capacitor discharge switches 30, 31 coupled in parallel over each one of the sampling capacitors $C_{sample1}$, $C_{sample2}$.

Figure 6:
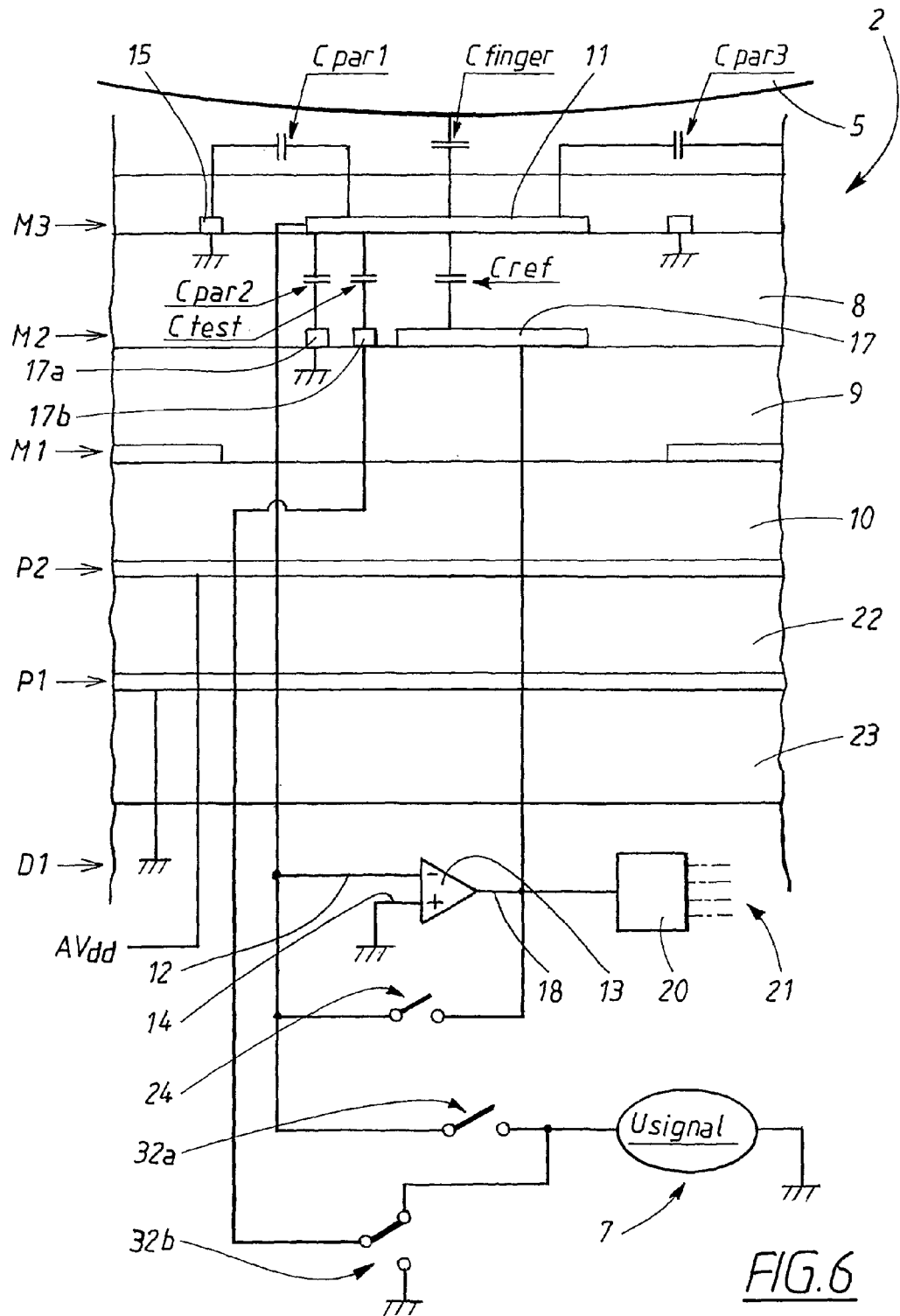
FIG. 6 schematically shows a cross-section of a fingerprint sensor element according to a second embodiment of the present invention.

In a second embodiment of the invention, shown in FIG. 6, the control unit 20 of the fingerprint sensor 1 is adapted for injecting a signal $U_{signal}$ to the finger 5, or sensing a signal from the finger 5, via the sensor electrodes 11. The sensor electrodes 11 alternate, either injecting a signal $U_{signal}$ or receiving an injected signal via the finger 5. For each sensor element 2, the control unit 20 controls a signal switch 32a that opens and closes a connection from the signal source 7 generating the signal $U_{signal}$ that is to be injected into the finger 5. Therefore, at a specific moment, some of the sensor electrodes 11 of the fingerprint sensor 1 function as sensor elements while the rest of the sensor electrodes function as means for injecting the signal $U_{signal}$ to the finger 5. At another moment some of the sensor electrodes 11 may have switched between these functions. In this embodiment, the frame 6 surrounding the fingerprint sensor elements 2 is only needed for ESD protection.

With regard to the case where a signal is detected by the sensor electrode, the sensor element 2 in question works in the same way using the same components and variants of components discussed with reference to FIG. 2a.

This second embodiment, described with reference to FIG. 6, enables the performance of a functionality check of each charge amplifier 13. A check switch 32b connects a second auxiliary lower electrode 17b, formed beside the auxiliary lower electrode 17a and/or the lower electrode 17, either to ground or to the signal source 7. When performing the check, the signal switch 32a is opened and the check switch 32b is put in such a position that it is establishing a connection from the signal source 7, generating the signal $U_{signal}$, to the auxiliary lower electrode 32b. A test capacitance $C_{test}$ is formed between the auxiliary lower electrode 32b and the sensor electrode 11, which sensor electrode 11 is connected to the negative input terminal 12 of the charge amplifier 13. This means that the generated signal $U_{signal}$ is connected to the negative input terminal 12 of the charge amplifier 13 via the test capacitance $C_{test}$.

The control unit 20 detects whether the charge amplifier 13 delivers an output signal. Since the signal source 7 is connected to the negative input terminal 12 of the charge amplifier 13 via the test capacitance $C_{test}$ during the check, the charge amplifier 13 should deliver an output signal if it is working as it should. In other words, each sensor element 2 transmits the signal $U_{signal}$ and detects the same directly, using its own charge amplifier 13. When not performing the test, the check switch 32b is put in such a position that it is establishing a connection between the auxiliary lower electrode 32b and ground.

Concerning the frame 6 surrounding the fingerprint sensor 1, an alternative application is to use an external capacitive frame 6, instead of the described conductive frame 6. Such a capacitive frame 6 comprises a conductive layer with capacitive coupling to the finger 5 via a thin dielectric insulating layer (not shown).

The present invention is not limited to what has been disclosed in the description above, but may vary freely within the scope of the appended claims. For example, the protective layer and the grounded ESD protection frame surrounding each sensor electrode are just precautions that may be omitted.

Figure 7:
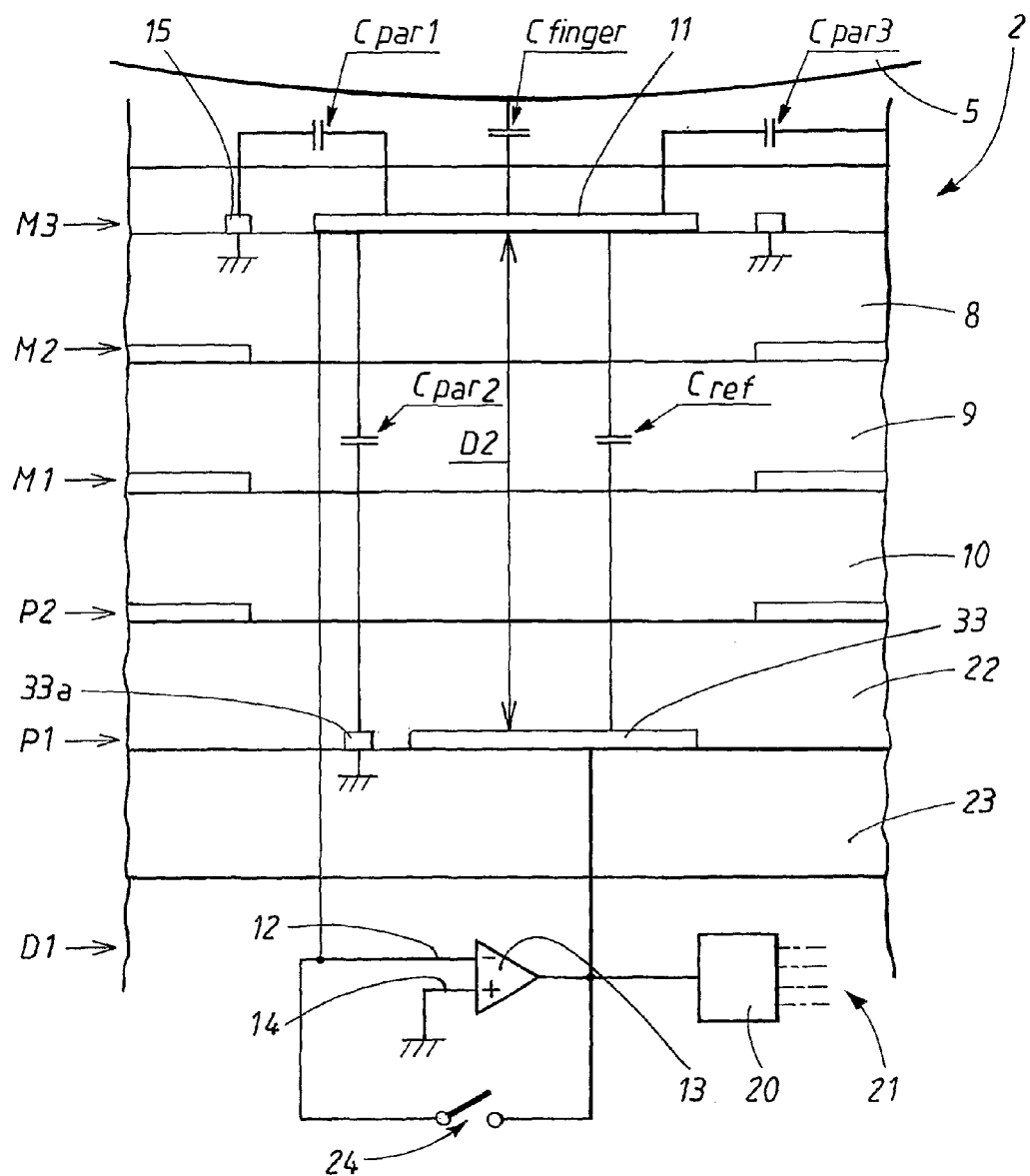
FIG. 7 schematically shows a cross-section of a fingerprint sensor element according to a third embodiment of the present invention.

In FIG. 7, according to a third embodiment of the present invention, a fingerprint structure according to the above is used in a different way. The negative input terminal 12 of a charge amplifier is here connected to a sensor electrode 11 in the first conductive layer M3. The fifth layer that is constituted by an electrically conductive layer P1 has a lower electrode 33 formed that is connected to the output 18 of the charge amplifier 13, increasing a distance D2 between the electrodes of the feedback capacitor $C_{ref}$ that now is formed between the sensor 11 electrode and the lower electrode 33, since there are no interfering structures between them, only the intermediate insulating dielectric layers 8, 9, 10, 22. For this purpose, apertures are made in the intermediate conducting layers M1, M2, P2. This increase of D2 decreases the total capacitance at the negative input terminal 12 of the charge amplifier 13, which in turn results in that the total noise of the circuit also decreases, since, as known to those skilled in the art, the noise increases with an increasing total capacitance at the negative input terminal 12 of the charge amplifier 13.

The intermediate layers M1, M2, P2 may for example be used for shielding and routing of electrical connections. For the rest, the sensor element 2 in question works in the same way using the same components and variants of components discussed with reference to FIG. 2a, and may also work in the same way using the same components and variants of components as discussed with reference to FIG. 6.

Further, the number of layers in the fingerprint sensor structure may vary depending on what is most suitable for the functions that are desired, the layer structure described is just an example. The use of the layers may also vary, depending on what is desired, as exemplified above with reference to FIG. 8, without leaving the scope of the invention. Further, for example, the connections to $AV_{dd}$ and ground shown for the layers P2 and P1, respectively, in the first and second embodiments described with reference to FIG. 2a and FIG. 6, may be changed to other suitable alternatives for technical or economical reasons. Other materials or combinations of materials than those described, for example thin-film structures, may be used.

Figure 8:
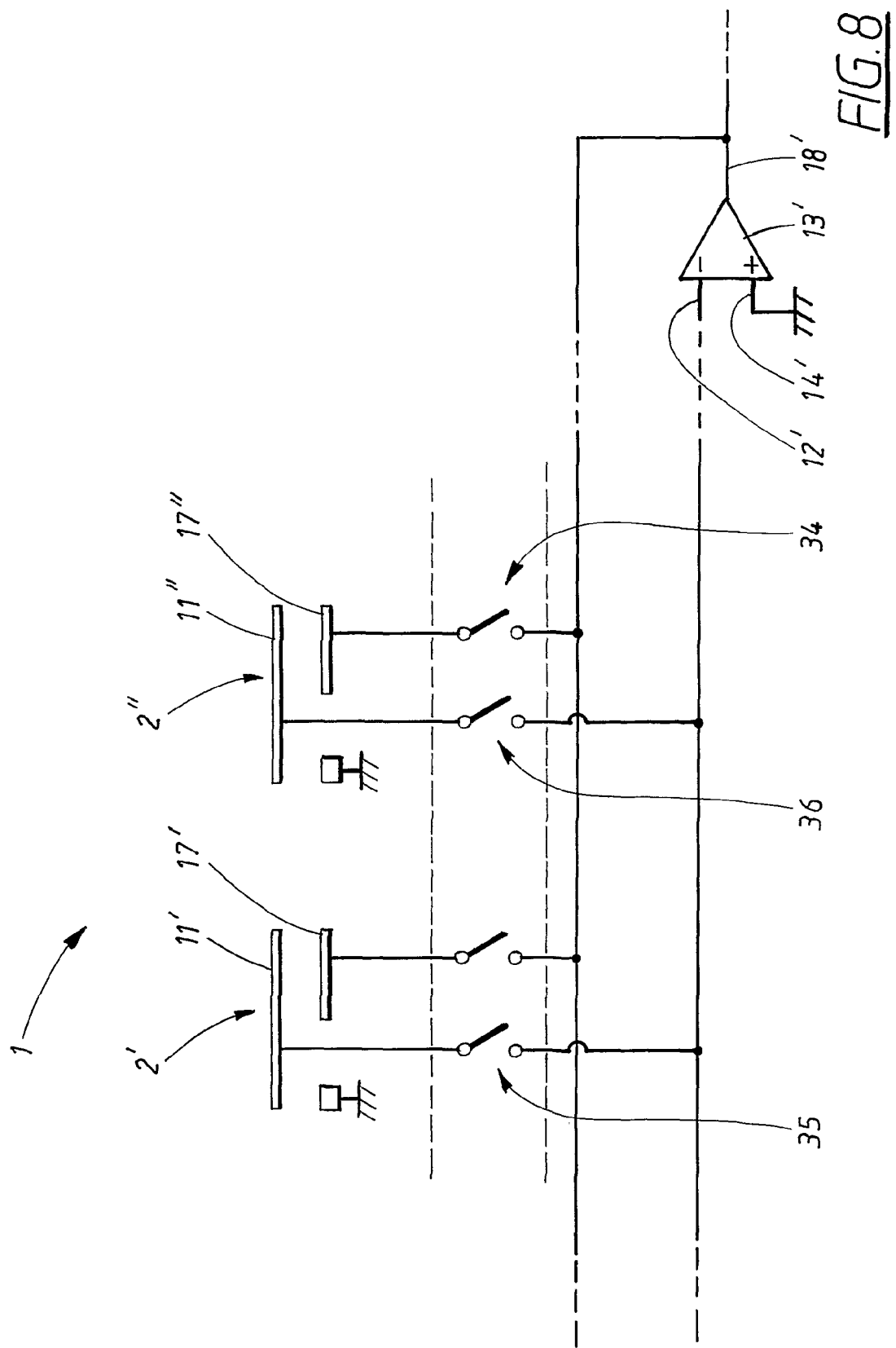
FIG. 8 schematically shows an embodiment where several fingerprint sensor elements are connected to one and the same charge amplifier.

Further, with reference to FIG. 8, at least two fingerprint sensor elements 2', 2", shown very schematically, may be connected to one and the same charge amplifier 13' via a switching means, preferably in the form of a multiplexer circuit 34. The multiplexer 34 switches between, on one hand, the negative input 12' and positive input 18' of the charge amplifier and, on the other hand, the corresponding electrodes 11', 17'; 11", 17" of one fingerprint sensor element 2', 2" at a time. In this way, all the fingerprint sensor elements in, for example, a row or a column in the fingerprint sensor 1 may be connected to one and the same charge amplifier 13' via the multiplexer circuit 34.

This arrangement also allows the resolution to be tuneable, since the signals of one or more electrodes may be added to, or subtracted from, each other, for example by closing more than one switch at the same time as the amplifier gain is corrected. If both switch pairs 35, 36 shown are closed, both sensor electrodes 11', 11" and both lower electrodes 17', 17" are engaged. As the reference capacitance $C_{ref}$ then is doubled, the gain is automatically corrected.

The sampling circuit 25 may alternatively (not shown) comprise only one branch, which branch in turn comprises a sampling capacitor, a capacitor discharge switch and a sampling switch. This branch is then coupled to an A/D converter, which converts the signal into digital format.

Further, the frame 6 surrounding the matrix of fingerprint sensor elements 2 as shown in FIG. 1, may be formed on the sensor chip, i.e. the chip on which the sensor structure s formed, or adjacent to the sensor chip. The frame 6 may also be formed as separated parts, such as one or two straight conducting bars at each side of the matrix of fingerprint sensor elements 2.

The frame 6 may be conductive, semi conductive or weakly insulating.

The auxiliary lower electrode 17a, 33a that is formed beside the lower electrode 17, 33, may be completely omitted, if desired. The second auxiliary lower electrode 17b shown in FIG. 6 may be placed in another layer, if suitable.

The charge amplifiers may for example be of the NMOS or PMOS type. Other kinds of amplifiers may also be conceivable.

If, for example, NMOS or PMOS is used, this determines whether the auxiliary electrode 17a, 33a and the second auxiliary electrode 17b, when the check switch 32 is not connected to the signal source 7, are connected to ground, which is the case in the embodiment examples in this description, or to a feeding potential, for example the $AV_{dd}$ connection. In either case, they are connected to an essentially fixed potential.

Note that the capacitors in FIGS. 2a, 6 and 8 are symbolic, and that they present a capacitance that is present due top the existing structure in a fingerprint sensor element. There may also be other capacitances that occur due to the existing structure in a fingerprint sensor element and which are not shown by means of a symbolic capacitor and/or discussed in the description.

The invention claimed is:

1. A fingerprint sensor element, comprising:
   a fingerprint sensor electrode formed in an upper conducting layer,
   a lower electrode formed in a lower conducting layer,
   at least one insulating layer between the upper conducting layer and the lower conducting layer,
   a charge amplifier having a negative input terminal and a positive input terminal and an output terminal,
   wherein an upper side of the fingerprint sensor electrode is arranged for facing a finger,
   wherein a lower side of the fingerprint sensor electrode is arranged for facing the lower electrode,
   where the fingerprint sensor electrode and the lower electrode are arranged in such a way that a capacitance is formed between them,
   where the positive input terminal of the charge amplifier is connected to an essentially fixed potential,
   wherein the fingerprint sensor electrode is arranged for being connected to the negative input terminal of the charge amplifier, such that the fingerprint sensor electrode is maintained at an essentially fixed voltage potential,
   wherein the lower electrode is arranged for being connected to the output terminal of the charge amplifier.

2. A fingerprint sensor element according to claim 1, wherein the fingerprint sensor electrode is directly connected to the negative input terminal of the charge amplifier and wherein the lower electrode is directly connected to the output terminal of the charge amplifier.

3. A fingerprint sensor element according to claim 1, wherein the fingerprint sensor electrode is connected to the negative input terminal of the charge amplifier and wherein the corresponding lower electrode is connected to the output terminal of the charge amplifier via a respective switching means, allowing several sensor electrodes and several corresponding lower electrodes to be connected to a single charge amplifier via the respective switching means.

4. A fingerprint sensor element according to claim 3, wherein the switching means comprises a switch network.

5. A fingerprint sensor element according to claim 3, wherein the switching means comprises a multiplexer.

6. A fingerprint sensor element according to claim 1, wherein an isolating protection layer is provided on the upper side of the fingerprint sensor electrode, between the finger and the fingerprint sensor electrode.

7. A fingerprint sensor element according to claim 1, wherein the sensor element comprises three conducting layers, two lower conducting layers and a semi conductive substrate layer, between which layers, intermediate insulating dielectric layers are provided.

8. A fingerprint sensor, comprising at least one row or one column of fingerprint sensor elements according to any one of the preceding claims.

9. A fingerprint sensor according to claim 8, wherein a shielding structure is provided in the upper conducting layer between each one of the sensor electrodes comprised in the fingerprint sensor.

10. A fingerprint sensor according to claim 8 wherein an external conductive, semi conductive, or weakly insulating structure is provided along at least one of a row or a column of fingerprint sensor elements, which structure is arranged to be in electric contact with the finger during sensing of the fingerprint of the finger.

11. A fingerprint sensor according to claim 10, wherein the external structure is connected to means for diverting ESD discharges from the finger.

12. A fingerprint sensor according to claim 10, wherein an electrical signal is provided to the finger via the external structure, separate from the sensor element.

13. A fingerprint sensor according to claim 10, wherein the external structure is weakly insulating and has a lower value of the breakdown voltage than the protective layer on a row or column of fingerprint sensor elements.

14. A fingerprint sensor element according to claim 8, wherein each sensor electrode is arranged for alternatingly either detecting an electrical signal or providing an electrical signal to the finger.

15. A fingerprint sensor according to claim 8, wherein each sensor electrode is arranged for both providing an electrical signal and detecting said electrical signal via the charge amplifier that is associated with the respective sensor electrode.

16. A fingerprint sensor according to claim 8, wherein an output signal from the charge amplifier output terminal of each sensor element is fed to a sampling circuit which in turn is connected to an A/D converter.

17. A fingerprint sensor according to claim 16, wherein the sampling circuit is arranged for performing double-correlated sampling.

18. A fingerprint sensor according to claim 16, wherein the sampling circuit is arranged for performing triple-correlated sampling.

19. A fingerprint sensor according to claim 16, wherein the sampling circuit is arranged for carrying out a sampling and subtraction procedure in a digital manner.

20. A fingerprint sensor according to claim 16, wherein the sampling circuit is arranged for carrying out the sampling and subtraction procedure in an analogue manner.

* * * * *